June 6, 1967  M. W. GUSTAFSON  3,323,192
ARRANGEMENT FOR CLAMPING A CUTTING BIT
Filed Oct. 18, 1965  2 Sheets-Sheet 1

INVENTOR.
Manfred W. Gustafson
BY Sommers + Young
Attorneys 3,323,192
ARRANGEMENT FOR CLAMPING A CUTTING BIT
Manfred Wallace Gustafson, Fagersta, Sweden, assignor to Fagerstra Bruk Aktiebolag, Fagersta, Sweden, a corporation of Sweden
Filed Oct. 18, 1965, Ser. No. 497,327
Claims priority, application Sweden, Oct. 21, 1964, 12,670/64
6 Claims. (Cl. 29—96)

This invention relates to an arrangement for detachably clamping a cutting bit in a groove or the like in a tool body for cutting work, for example in a milling cutter, side mill or another cutting tool, the said cutting bit preferably being a throw-away bit having rhomboid, rhombic, rectangular or parallel-trapezoid cross-section.

The invention is substantially characterized in that the cutting bit for its clamping is provided with at least one recess in at least one of the two side surfaces of the bit and kept pressed both against the one edge of the groove and the adjoining portion of the groove bottom by a clamping member chucked between the recess in the cutting bit and the opposite edge of the groove.

Due to the arrangement according to the invention the cutting bit is subjected by the clamping member to forces having directions adapted for effectively retaining the cutting bit, viz. towards the surfaces to which the cutting bit abuts, i.e. the edge and the bottom of the groove. Thus, an effective fixing of the cutting bit is obtained by an arrangement of a simple construction which also is easily and rapidly to detach. Moreover, the said bit will not be displaced from its clamped position by forces due to inertia and other outside forces. The clamping member comprised in the arrangement according to the invention also is designed resilient and by means of a clamping device provided with adjustable clamping effect against the cutting bit.

A further essential feature of the invention is that the assembly height can be made a minimum. For a milling cutter, for example, intended for wood-working the lowest possible radial assembly height is required, which makes the invention highly adapted for this use. This applies in general to all situations when a milling cutter, side mill or another cutting tool is desired to have a minimum radial assembly height.

The invention will be described in the following in greater detail, reference being had to the accompanying drawing showing embodiments of the arrangement according to the invention for a milling cutter for wood-working.

Figure 1:
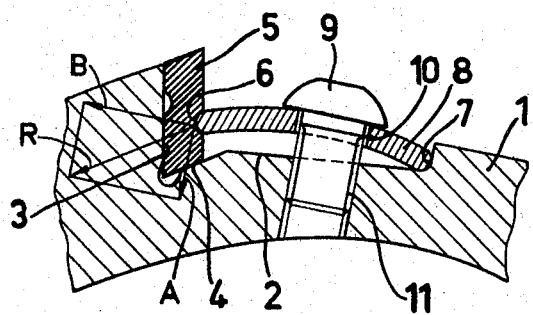
FIG. 1 shows a radial section through a portion of the milling cutter and a cutting bit mounted therein and through a clamping arrangement for the cutting bit.

Referring to the figures, the milling body 1 has an axially extending groove 2 whereof the one groove edge 3 and the adjoining portion 4 of the groove bottom serve as support surfaces for a cutting bit 5. The cutting bit, in this case a throw-away bit, is on its side surfaces provided with longitudinal recesses 6. Between the recess located on the side surface facing away from the groove edge 3 and the opposite groove edge 7 there is clamped a resilient clamping member 8 in the form of a curved plate being concave to the bottom of the groove. A clamp bolt 9 is inserted through a hole 10 in the clamping member and screwed into a threaded hole 11 in the milling body. The throw-away cutting bit shown has rhomboid cross-section, and the bottom portion 4 of the groove is designed angular in relation to the groove edge 3, said angle being in agreement with the angle between the side and edge surface of the cutting bit. The cutting bit as well as the clamping member and clamp bolt are substantially entirely sunk into the groove 2 which results in the lowest imaginable radial assembly height.

Upon tightening the clamp bolt 9 the force components A and B are formed at the contact line between the cutting bit 5 and the clamping member 8. The force A in the first phase presses the cutting bit against the bottom portion 4, at the same time as the force B presses the cutting bit against the groove edge 3. Hereby, the cutting bit was effectively fixed in its position. Upon continued tightening of the clamp bolt 9 the forces A and B will gradually increase in size, the force B being increased to a higher degree due to the fact, that the resilient clamping member 8 seeks to straighten its original curved shape. By slightly tightening the clamp bolt a considerable clamping force of the cutting bit is obtained. Any force due to inertia or other outside force seeking to displace the cutting bit from its position in the radial direction of the cutter, will additionally increase the retaining force, because also in this case the resilient clamping member is given the tendency of the becoming straight.

Figure 2:
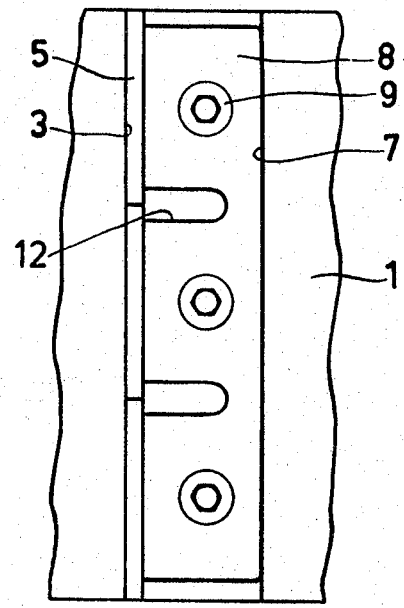
FIGS. 2–5 show on a somewhat smaller scale horizontal plan views of different embodiments of the clamping arrangement and the cutting bit.
Figure 3:
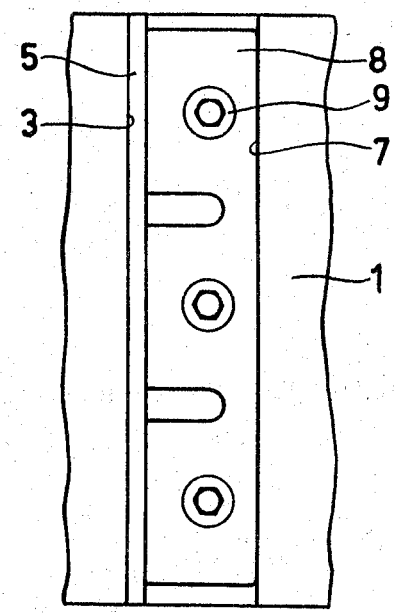
Figure 4:
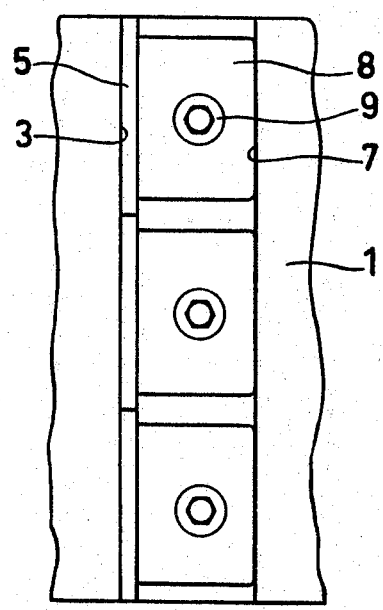
Figure 5:
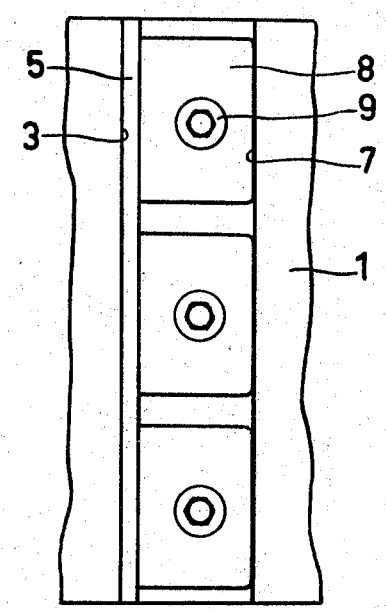

In FIGS. 2–5 different embodiments and combinations of cutting bits and clamping members are shown. FIG. 2 shows a clamping member provided with three clamp bolts and adapted to retain three cutting bits arranged edge to edge one after the other. The clamp member is provided with recesses 12 between the clamp bolts, said recesses originating at the edge facing away from the cutting bits and extending substantially on the same level as the clamp bolts. By this design, the resilience of the clamping member is increased. In FIG. 3 only one longitudinal cutting bit is arranged, the remaining details of FIG. 3 being in agreement with the arrangement shown in FIG. 2. Like FIG. 2 also FIG. 4 shows three cutting bits arranged edge to edge, but the bits are held clamped by three separate clamping members. FIG. 5, finally, shows three separate clamping members as in FIG. 4 which hold a longitudinal cutting bit.

The invention is, of course, not restricted to the aforedescribed embodiments, but may be modified in several ways within the scope of the following claims. For example, the cutting bit must not be a throw-away bit, even if it is to prefer in most cases. The cutting bit was shown having rhomboid cross-section, but it may also be rhombic, rectangular or parallel-trapezoid. Depending on the tool in question, the cutting bit seen from its support plane may also have a geometric shape other than shown and described. The recesses may vary in number, size and shape. The invention neither is restricted to the members shown and their design nor to the number of cutting bits clamped. The material of the cutting bits and tool body may be any material adapted for the working intended.

What I claim is:
1. Apparatus for mounting a cutting bit comprising a tool-mounting body having a recess defined by a bottom wall, and front and rear edge walls, said bit having a acute-angled edge portion fitting in an angle formed by said bottom wall and said rear edge wall, said tool having at least one rounded recess in its surface facing opposite the rear wall, and outwardly convexly curved, resilient clamping plate in said recess having a front edge and a rear edge engaging in said rounded recess of said bit, said rear edge of said plate being rounded correspondingly as said recess in said bit, said rear edge wall of said recess forming an obtuse angle with a plane passing through the centers of the front and rear edge of said plate, considered in the direction of said bottom wall, said bottom wall having a screw-threaded hole, said curved clamping plate having a hole located in alignment with said screw-threaded hole, and a bolt extending through said hole in said clamp plate and screw-threadedly engaging in said hole in said bottom surface, to press said clamping plate toward said bottom and to cause said plate to tend to flatten, the width of said groove being less than the combined width of said tool and said clamping plate when said plate is flattened by said bolt, whereby the locking components of force of said tool pressing against said obtuse angle surfaces of said rear edge wall are materially increased as said locking plate is flattened.

2. The arrangement as defined in claim 1 wherein the cutting bit abuts against the edge of the groove with substantially its entire side surface and the clamping member as well as the clamping device are disposed substantially entirely sunk in the tool body.

3. The arrangement as defined in claim 2 wherein the clamping plate is a concavely curved relative to the bottom of said recess.

4. Apparatus according to claim 1 for clamping a plurality of cutting bits of a relatively smaller size arranged edge to edge one after the other in which a plurality of clamping plates are arranged in parallel with the extension of the cutting bits in which said clamping plate is provided with recesses originating from the edge facing the cutting bits and located between the clamping devices.

5. Apparatus according to claim 4 and in which the recesses extend substantially on the same level as the said clamping devices.

6. Apparatus according to claim 1 and in which said bolt abuts with its head against the outer surface of the clamping member facing away from the recess bottom.

References Cited
UNITED STATES PATENTS

| | | | |
|---|---|---|---|
| 1,493,626 | 5/1924 | Gebhardt | 29—105 X |
| 1,964,786 | 7/1934 | McLean | 29—105 X |
| 2,181,023 | 11/1939 | Moore | 29—96 |
| 2,521,035 | 9/1950 | Boyle | 29—105 |
| 2,521,868 | 9/1950 | Otto | 29—105 X |

WILLIAM W. DYER, Jr., *Primary Examiner.*

HARRISON L. HINSON, *Examiner.*